United States Patent [19]

Ast

[11] Patent Number: 4,718,335

[45] Date of Patent: Jan. 12, 1988

[54] METHOD FOR RECOMPRESSING BALES OF FIBROUS MATERIAL

[76] Inventor: Gene Ast, 40380 Midway, San Jacinto, Calif. 92383

[21] Appl. No.: 926,569

[22] Filed: Nov. 4, 1986

Related U.S. Application Data

[62] Division of Ser. No. 792,000, Oct. 28, 1985, Pat. No. 4,676,153.

[51] Int. Cl.⁴ ............................................. B65B 13/20
[52] U.S. Cl. ................................................. 100/3; 100/7; 100/188 R
[58] Field of Search .................. 100/3, 7, 188 R, 19 R

[56] References Cited

U.S. PATENT DOCUMENTS

| | | | |
|---|---|---|---|
| 250,135 | 11/1881 | Dederick | 100/3 |
| 677,148 | 6/1901 | Webb | 100/3 |
| 3,824,758 | 7/1974 | Hart et al. | 100/7 |
| 4,074,623 | 2/1978 | White | 100/3 |
| 4,090,440 | 5/1978 | Jensen | 100/3 X |
| 4,117,775 | 10/1978 | White et al. | 100/19 R |
| 4,158,994 | 6/1979 | Jensen | 100/3 |
| 4,334,466 | 6/1982 | Spiegelberg | 100/188 R X |
| 4,343,131 | 8/1982 | McCormick et al. | 100/7 X |
| 4,676,153 | 6/1987 | Ast | 100/7 |

Primary Examiner—Andrew M. Falik
Attorney, Agent, or Firm—Frank J. Dykas

[57] ABSTRACT

A method for recompressing bales of fibrous material wherein the bales of hay or other fibrous material which are recompressed to approximately half of their original volume and then retied with bale twine and then held in a decompression chamber for a sufficient period of time to allow for trapped air to escape and for the fibrous material to loose some of its resiliency before subjecting the retied bales to unrestricted recoil stresses. Bales are recompressed in the recompression chamber, then tied, then transferred, under full compression, to a decompression chamber where they are held for said period of time prior to being ejected from the machine.

2 Claims, 9 Drawing Figures

METHOD FOR RECOMPRESSING BALES OF FIBROUS MATERIAL

This is a division of application Ser. No. 06/792,000 filed Oct. 28, 1985, U.S. Pat. No. 4,676,153.

BACKGROUND OF THE INVENTION

This invention pertains to a method used to recompress bales of hay or straw. In particular, it pertains to an apparatus which hols the bale of fibrous matrial in compression for an extended period of time so as to minimize the resiliency or recoil of the bale after it is tied with baling twine and dropped out of the apparatus.

DESCRIPTION OF THE PRIOR ART

Hay and other roughage for feeding animals must often be transported over great distances from the place of production to the location of the animals. It is not uncommon to ship large quantities of hay and straw to dairies located near metropolitan areas, feed lots, and to locations to where hay and stray cannot be grown or where there is a limited availability of land on which to grow hay and straw, examples would be Hawaiian Islands, Japan and regions of Alaska. As a result there has been a substantial export market for American hay and straw.

Hay is typically harvested in the United States by use of hay balers, either of the type that produce square bales or, round bales. The use of square bales is by and far the most common method of harvesting hay. These bales are constructed of predetermined densities by the bale machines within a certain normal range of densities. In determining the density of the hay in the standard field bale consideration is given to optimizing storage life, optimizing food value of the product, minimizing damage through high or low moisture contents and the actual weight of the bale that has to be handled by the farmer or dairyman.

However, it is uneconomical and impractical to ship standard field bales overseas. The freight costs because of the low density and high volumes would be prohibitive. Therefore, a number of methods have been developed to increase the density of the hay so as to minimize freight costs. The two most common methods are first to chop the hay and compress it into pellets or cubes which are approximately one inch square. A second method is to recompress the original bale to approximately half its volume and stack the recompressed bales into standarized dry cargo freight containers which can then be transported to a seaport and loaded aboard a containerized cargo ship.

One of the problems that consistently plagues processers who prefer to cube or pelletize their hay is the high energy consumption associated with doing so and the close tolerances for moisture content which are required. It takes a lot of equipment, and relatively high pressures to form the pellets or cubes. Additionally, this sophisticated equipment is expensive. The expense of the equipment added to the high energy costs sometimes make it uneconomical to manufacture and distribute cubes.

Those desiring to recompress bales must solve the problem of hay bale recoil. The fibrous material of hay or straw has a certain inherent resiliency characteristics. Often times the fibers are hollow and there is a lot of air within the bale. When the hay or straw bale is recompressed to approximately half of its original size, air is trapped, under pressure, within the recompressed bale. This trapped compressed air and the inherent resilient characteristics of the material itself cause the hay bale to recoil or expand back to a size larger than that desired for the recompressed bale.

This recoil property of the recompressed bale causes significant increase in stress against the banding material over that experienced in a normal field bale. As a result hook and latch wires, wire twine or steel bands are used in lieu of string or bale twine. Standard bale twine is not strong enough to withstand the forces of recoil. If standard baling string twine is used there will be a significant increase in the number of broken strings, hence broken bales and a drastic slowdown in production.

If hook and latch wires are used, there is an increase in labor costs as a result of the fact the latch must be manually inserted in the hook. Finally, if wire twine, steel bands or hook and latch wires are used to form the bale, there is concern that extra care must be taken to insure that the animals who eventually will eat or use the feed do not eat these steel wires or banding materials. Cattle, and other members of the bovine species are, in particular, sensitive to wire. If they ingest wire twine or a hook and latch wire or a piece of one if the recompressed bale is chopped prior to being fed to the animal, serious injury or death can occur. The same is not true for string twine which can be readily digested or passed by a ruminary animal.

Methods have been developed in the past such as the one disclosed in Jensen, U.S. Pat. No. 4,158,994, dated June 26, 1979, to relieve the internal expansion stresses of recoil at the time that the recompressed bale is first tied. In Jensen, U.S. Pat. No. 4,158,994 the method employed is to over compress the recompressed bale and then to allow it to expand back to the desired size an apparatus for accomplishing the same is disclosed in Jensen, U.S. Pat. No 4,090,440 dated May 23, 1978.

However, it still is not a satisfactory solution to the problems since it still results in broken twine and requires the use of wires or steel.

SUMMARY OF INVENTION

Accoringly, it is an object of this invention to provide a method of relieving the internal stresses within the bale which result in a recoil effect and which are caused by trapped air and the resilent characteristics of the fibrous material. It is an object of this invention to relieve these stresses in such a manner and to a degree that ordinary string twine can be used as opposed to metal wire or steel banding straps.

It is a third object of this invention to provide a method of handling recompressed bales which minimizes the amount of manual labor necessary.

Another object of this invention is to provide an method which will produce recompressed bales which will not break ordinary string baling twine.

These objects are accomplished by use of a machine wherein the recompression chamber is formed of a fixed end wall, top, bottom and side walls. Recompression is accomplished by means of a recompression ram having a platen which slides into the chamber in the direction of the fixed end wall. A bale is introduced into the chamber for recompression with its original baling twine strings removed. The recompression ram then recompresses the bale inside the recompression chamber against the end wall to approximately one-half of its original volume. the recompressed bale is then tied with standard bale twine, using standard knotters and needles.

There is attached to the recompression chamber another chamber known as the decompression chamber. It is sized to the exact same dimensions in length and width as the recompression chamber when the platen of the recompression ram has been fully inserted into the recompression chamber to recompress a bale. In the preferred embodiment said decompression chamber is open to the bottom of the recompression chamber so that when the platen of the recompression ram is stopped at the end of its compression stroke, in the process of recompressing a bale of hay, a transfer ram and platen disposed in the top of the recompression chamber can be utilized to push the tied, recompressed bale, which is still under compression, into the decompression chamber.

The recompressed bale is pushed only far enough into the decompression chamber so as that the top of the recompressed bale being held under compression in the decompression chamber is in the same plane with the bottom plate of the recompression chamber, and functions as part of the bottom of the chamber in relationship to the insertion of a new field bale into the recompression chamber for recompacting.

In the sequence of the preferred embodiment the recompression ram stops at the furthermost extent of its compressive stroke where the bale is tied. The transfer ram then pushes the recompressed bale, under compression into the decompression chamber. Then, the recompression ram is withdrawn and a new field bale is inserted into the recompression chamber.

Once the new second field bale is inserted into the recompression chamber the same recompacting and tieing cycle is run and when the transfer ram is activated the second recompacted bale, which has been tied with string baling twine, is pushed down into the decompression chamber where it continues to be held in compression.

A third field bale is then inserted and the cycle is again repeated. However, when the third recompacted bale is transferred into the decompression chamber it automatically ejects the first recompacted bale out through the opening at the bottom of the decompression chamber.

In this manner the recompacted bale is held under compression for at least thirty seconds thus allowing time for trapped air to escape from the recompacted bale and for the resilient characteristics of the material, which together comprise or the internal expansion stresses within the bale to be relieved prior to the time that the string baling twine is subjected to unregulated tensile stress.

FIG.s 3–7 are schematic side views of the recompacting apparatus illustrating various steps in the recompactin process.

Figure 8:
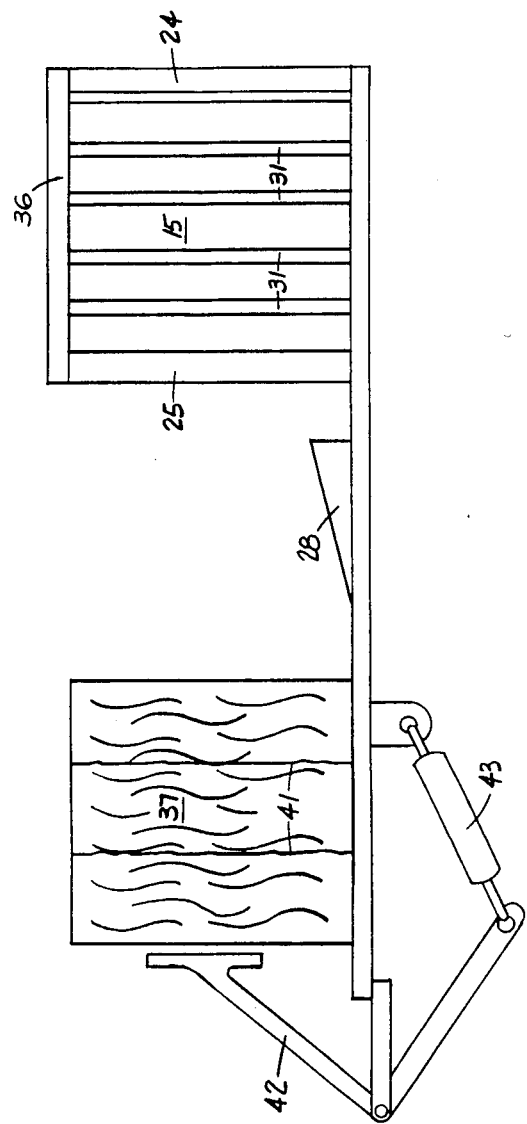

FIG. 8 is a schematic side view of alternate loading mechanism.

Figure 9:
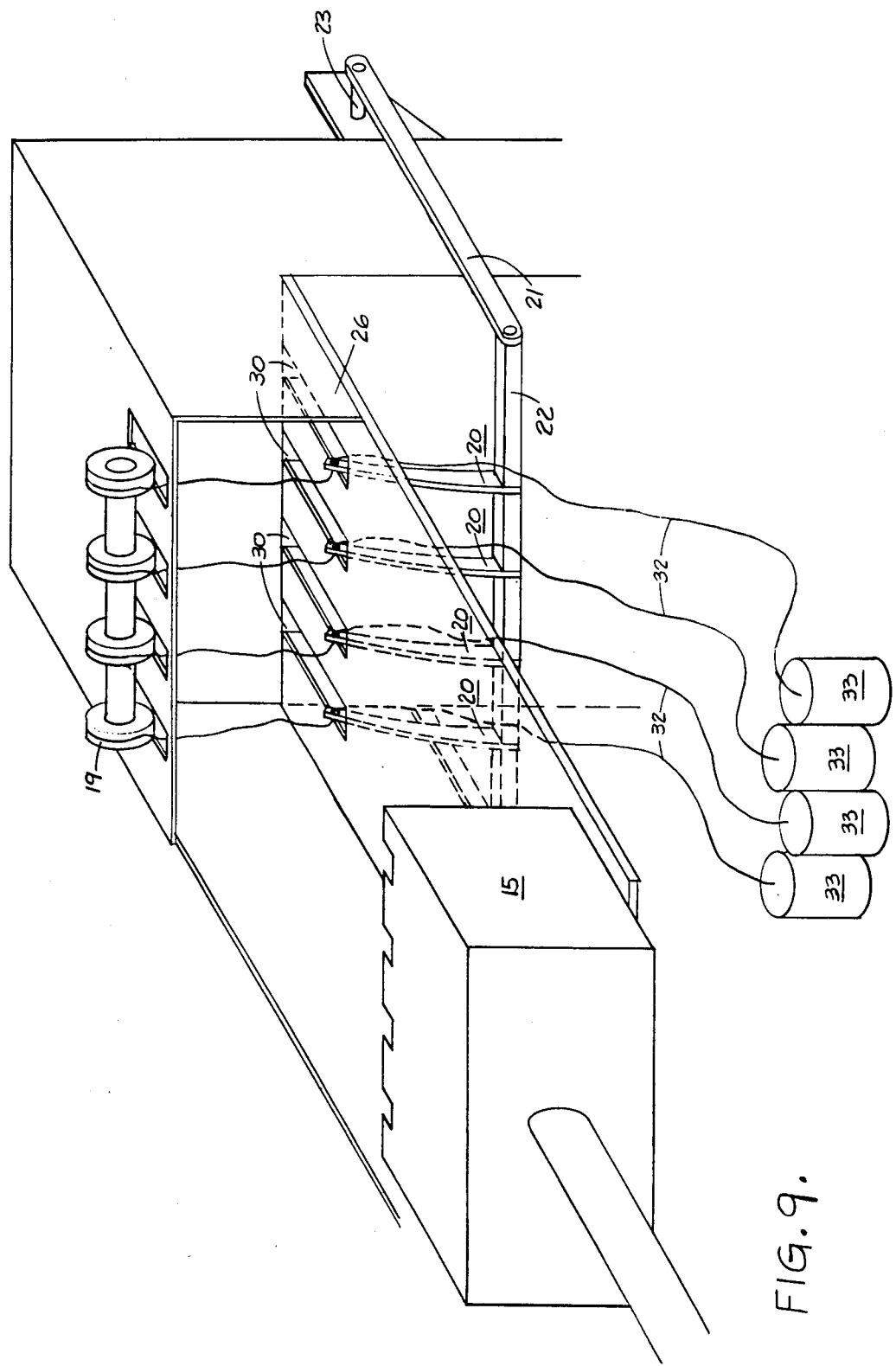

FIG. 9 is a perspective view of needle and knotter assembly.

DETAILED DESCRIPTION OF THE PREFERRED EMBODIMENT

Figure 1:
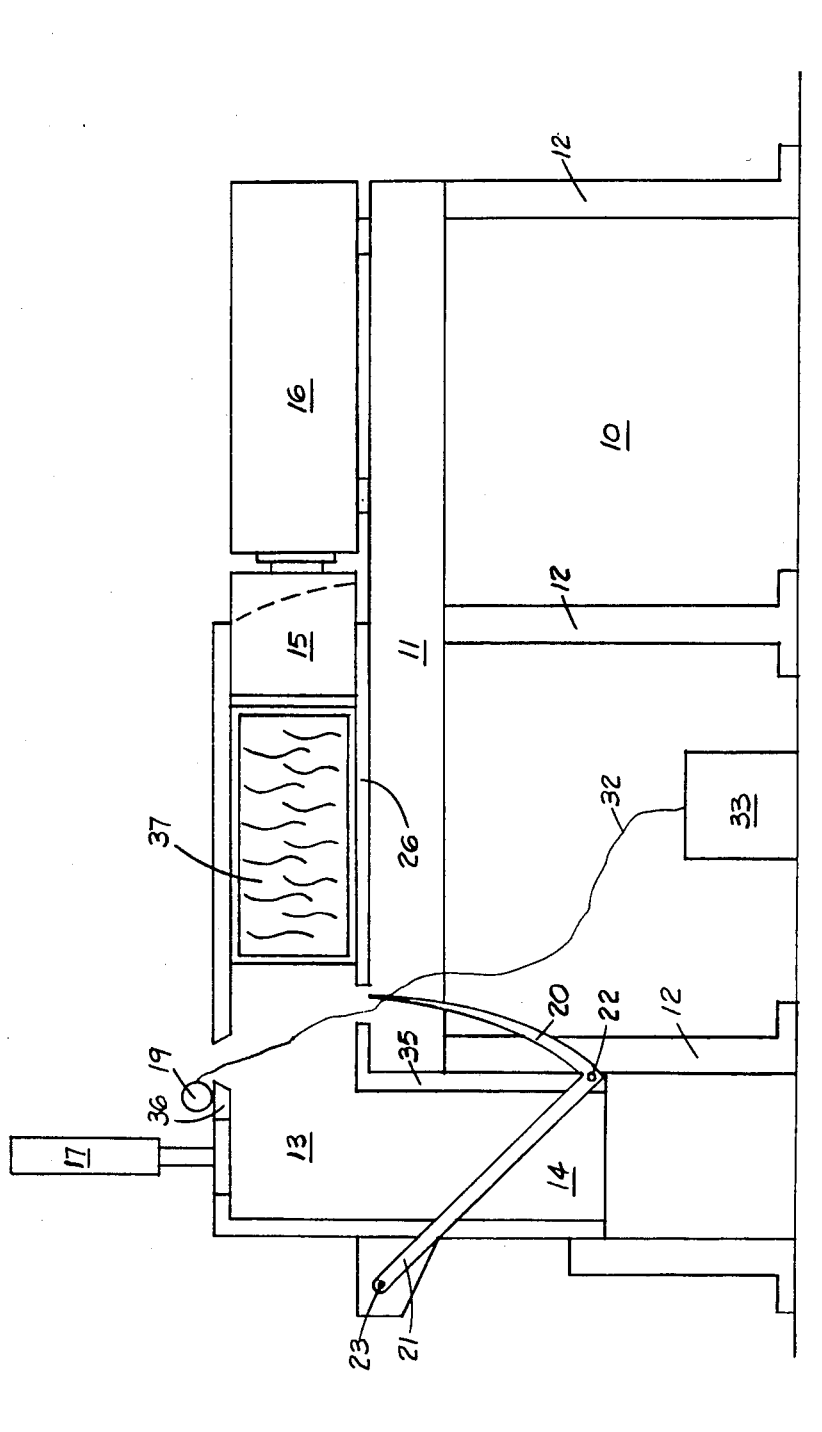
FIG. 1 is a schematical representation of the side view of the recompacting apparatus emboding the principals of the invention.
Figure 2:
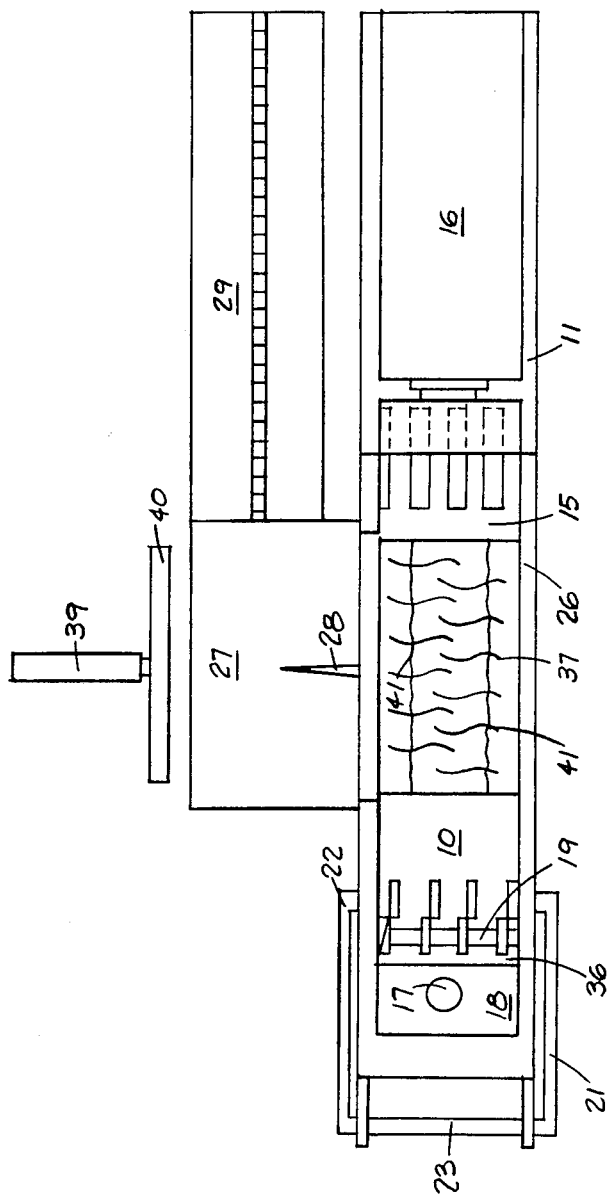
FIG. 2 is a schematic plan view of the recompression apparatus.

First referring to FIGS. 1 and 2 the fibrous material bale recompressor 10 is shown to advantage. The bale recompression chamber 13 is defined by end plate 34, top plate 36 and side plates 24 and 25. In the preferred embodiment the recompression chamber 13 is open at the bottom to decompression chamber 14 which is defined by end plate 34, side plates 24 and 25 and decompression front plate 35.

Referring to FIGS. 1 and 2 field bale 37 is conveyed up to receiving platform 27 via field bale loading conveyor 29. Loading ram platen 40 attached to loading ram 39 then pushes field bale 37 onto the bottom slide plate 26 in a position where the bale is correctly positioned for injection into recompression chamber 13. In the process of pushing bale 37 onto bottom slide plate 26, field bale twine 41 pass across field twine cutting knife 28 which cuts the original field bale twin 41 so they can be readily pulled off the original field bale by the machine operator.

FIG. 8 shows to advantage an alternative to the use of a loading ram 39 and platen 40. Mechanical advantage can be obtained by use of cantlevered arm 42 attached to driving mechanism 43 to push field bale 37 across receiving platform 27 onto bottom slide plate 26. As can be seen to advantage in FIG. 8 field bale twine 41 is cut by field twine cutting knife 28 as field bale 37 is slide onto bottom slide plate 26.

Figure 3:
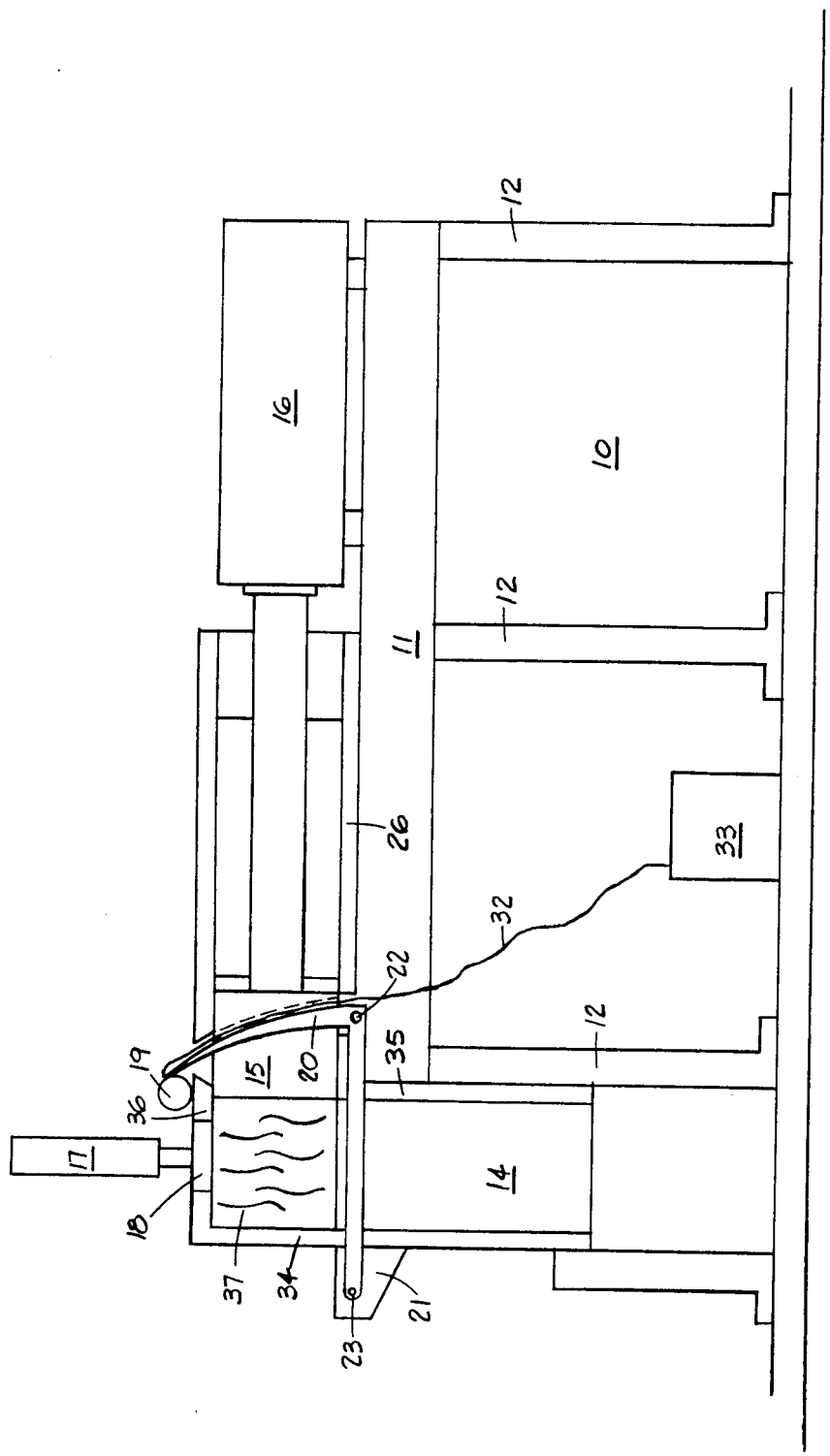

Once field bale 37 has been properly positioned on bottom slide plate 26, in position to be recompacted, as is shown in FIGS. 2 and 3, recompression platen 15, attached to recompression ram 16, pushes field bale 37 into recompression chamber 13. In the process of being pushed into recompression chamber 13, field bale 37 intercepts four strings of bale twine 32, which originates from four twine spool 33, and are threaded through needles 20 and attached to knotter 19. Field bale 37 pushes the twine ahead of it. When the front of field bale 37 reaches end wall 34 it has wrapped bale twine 32 around the bottom front and top of the field bale 37.

Figure 5:
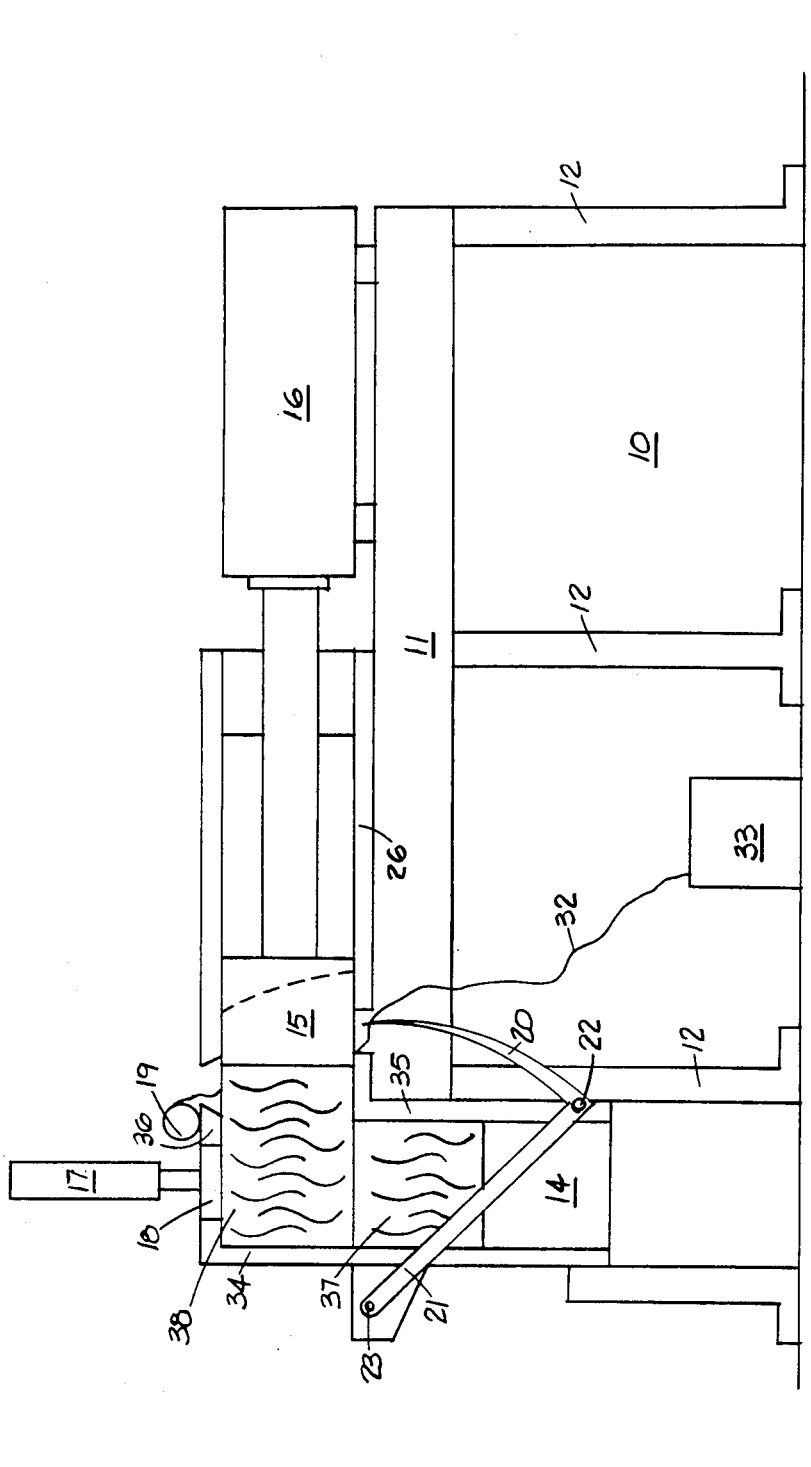

As can be seen in FIGS. 1 and 3, the bottom of recompression chamber 13 is fully opened to decompression chamber 14. it has been found in practice there are insufficient vertical stresses within the bale being recompressed to significantly affect the ability to recompress field bale 37 in a chamber which does not have a bottom side. As is shown in FIG. 5 a recompressed bale is eventually positioned at the top of decompression chamber 14 and functions as a bottom side to recompression chamber 13.

FIGS. 2 and 9 show to advantage the recompressed bale tieing apparatus. Standard knotters 19 and design needles 20 and activation devices 23 are well known in the art of bale tieing For example see White, U.S. Pat. No. 4,074,623 and White, et al., U.S. Pat. No. 4,117,775. When the recompressed bale 37, as shown in FIG. 3 is in a fully compressed state, needle activation device 23 activates to swing needles 20, attached to needle yoke 22, by means of needle arms 21, up through slots 30 in bottom slide plate 26. As is shown in FIG. 2 slots 31 are provided in recompression platen 15 so as to permit travel of needles 20 from slots 30 in the bottom slide plate up to needle opening 44 in top plate 36. Needles 20 in the process of sliding upward through slots 30 and bottom slide plate 26, carry with them bale twine 32.

When needles 20 are fully extended, as is shown in FIG. 3, they engage conventional knotters 19 which operate to: tie knots in the twine which has been wrapped around the recompressed bale; to cut the twine; and to retain the bitter end of the cut twine 32 which is threaded through needles are retracted by needle activation device 23 20, as needles 20.

Figure 4:
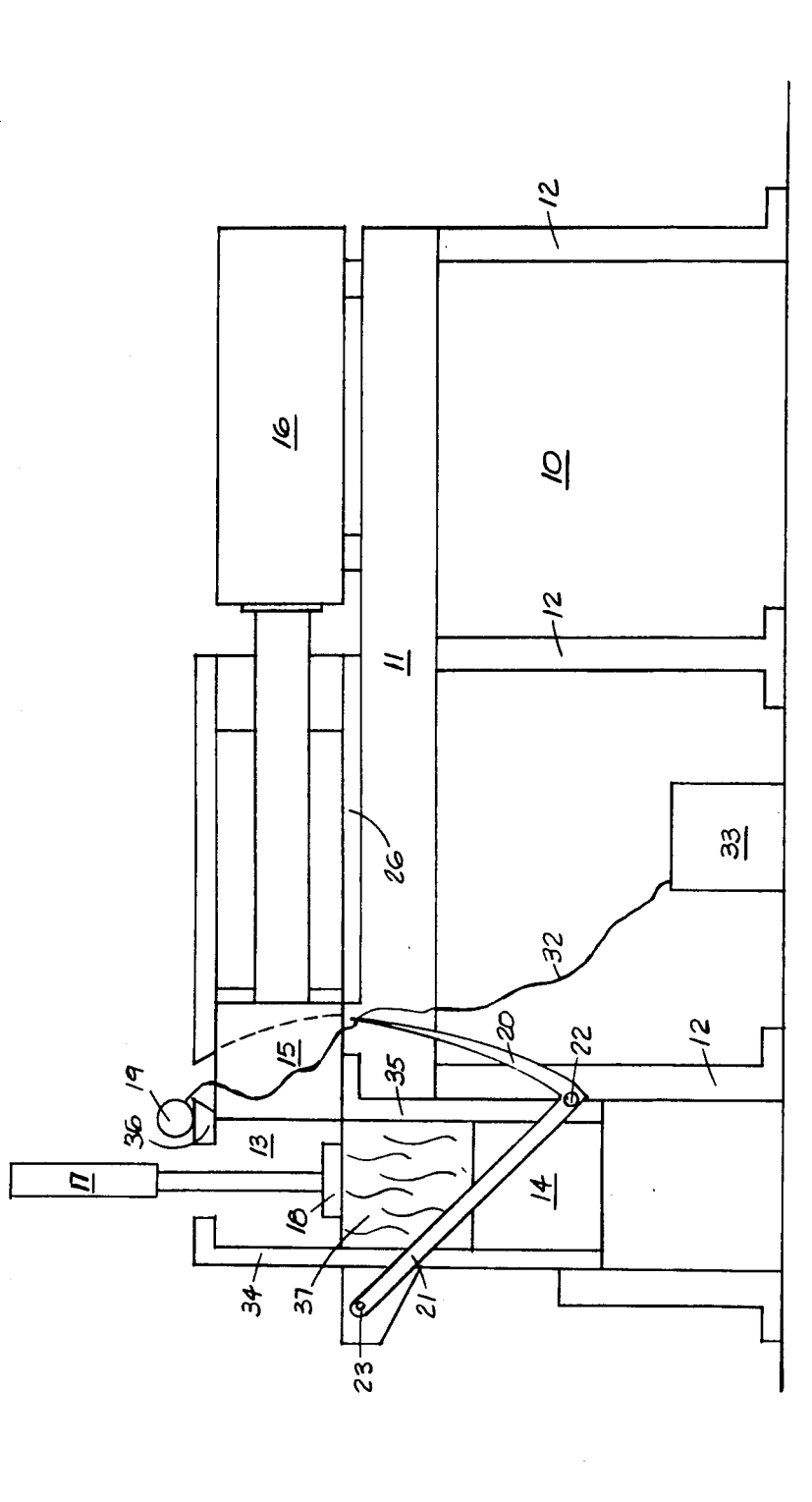

Referring to FIG. 4, once bale 37 has been tied, and the twine 32 cut, with the bitter end retained by knotters 19, and the needles 20 withdrawn, and prior to withdrawal of recompression platen 15, ejection ram 17 is activated so that ejection platen 18 pushes recompressed bale 37 into decompression chamber 14. As is shown in FIG. 4, the end of recompression platen 15 is aligned with the decompression chamber front plate 35 so that recompressed bale 37 will slide into decompression chamber 14 while remaining in a fully compressed state.

Figure 6:
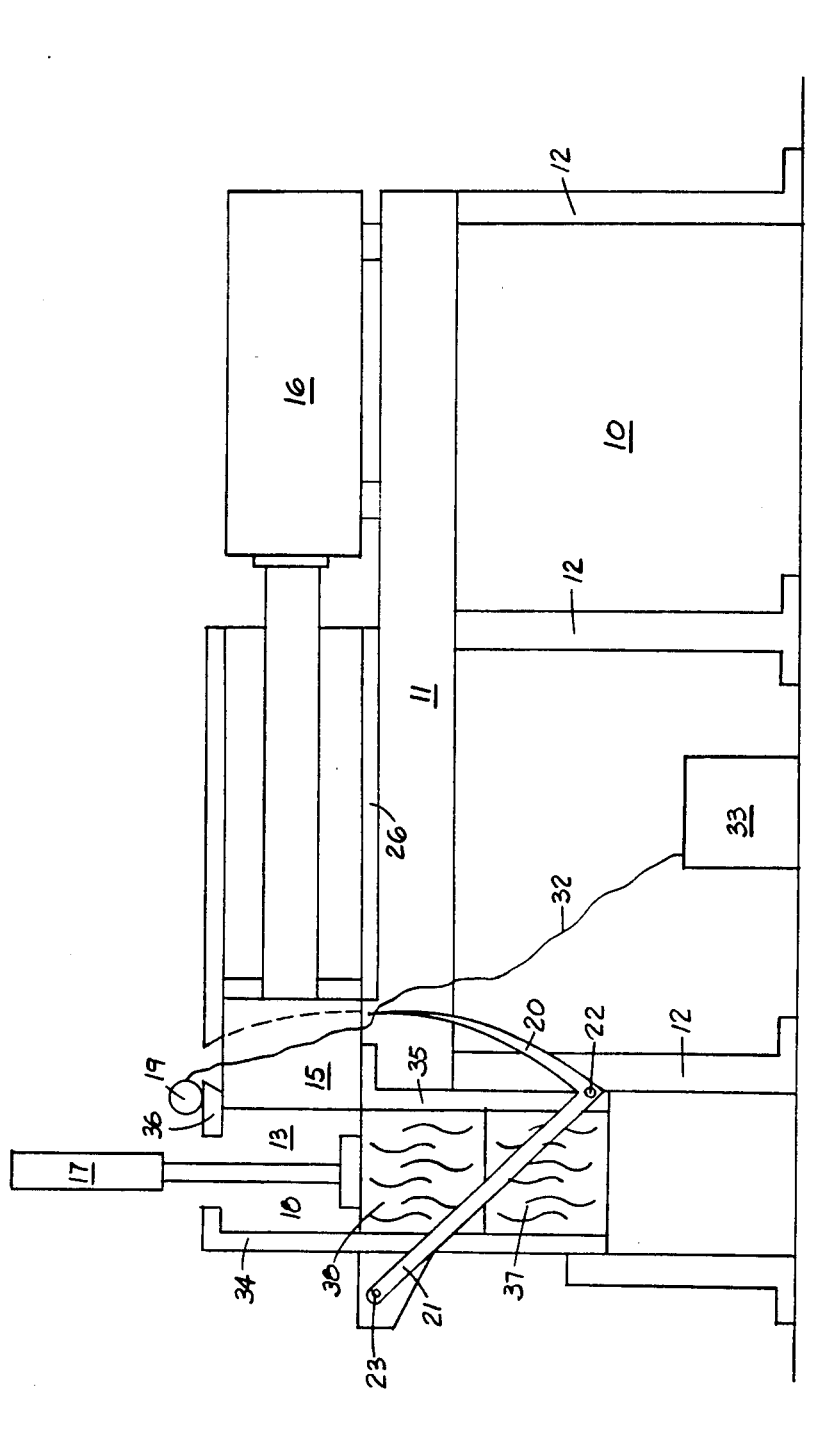

Next referring to FIGS. 4, 5, 6 and 7, operation of the recompression apparatus 10 utilizing decompression chamber 14 is shown to advantage. First referring to FIG. 4, it is shown that recompressed bale 37, is pushed into decompression chamber 14 only far enough to define a defacto bottom plate for recompression chamber 13. In FIG. 5 a second field bale 38 is being recompressed. In FIG. 6 the second recompressed bale 38 is pushed by ejection platen 18 into decocmpression chamber 14, thereby pushing or displacing the first recompressed bale 37 down into the second position of decompression chamber 14.

Figure 7:
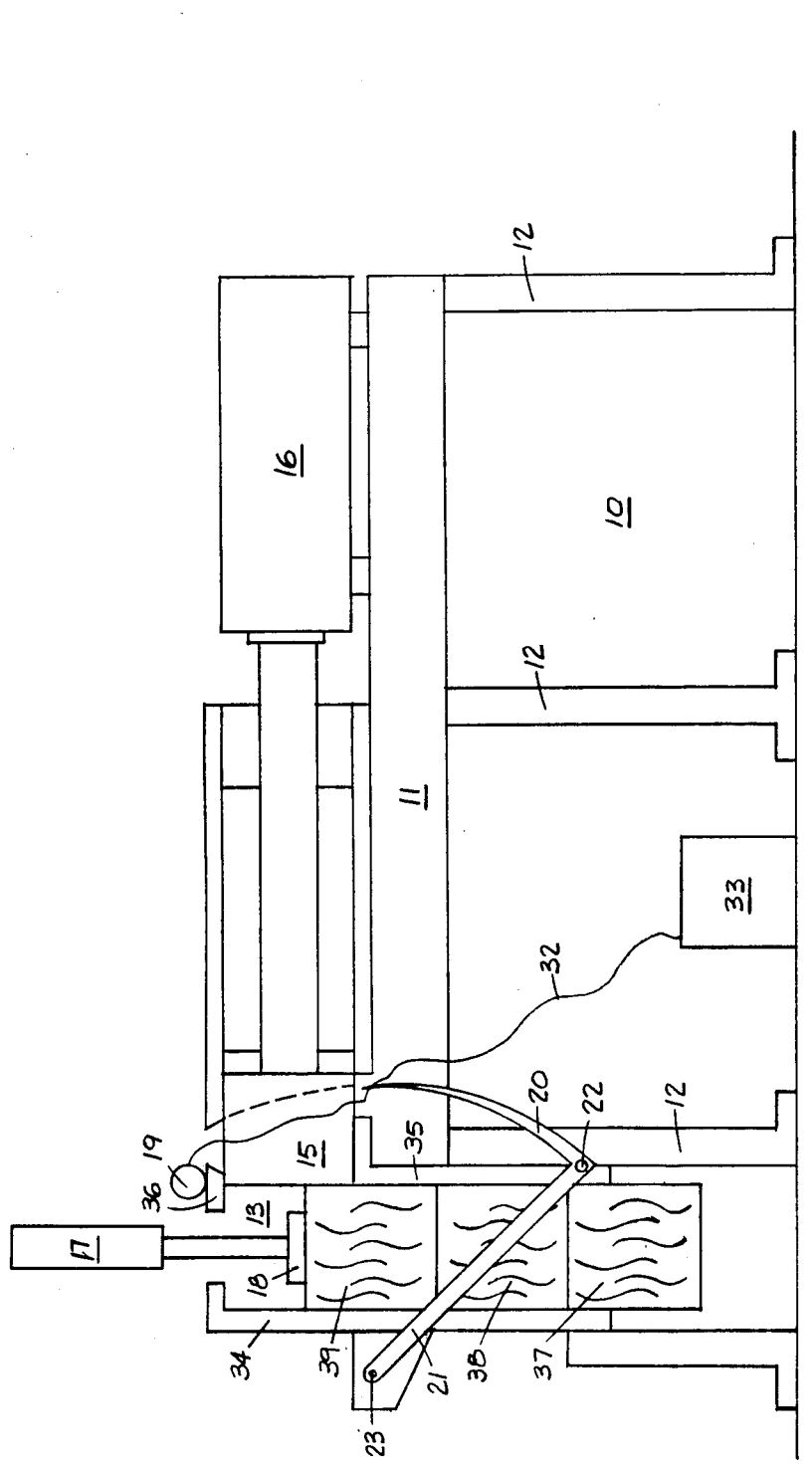

When a third bale 39 as is shown in FIG. 7 is recompressed and pushed into decompression chamber 14, first bale 37 is ejected by the displacement action in decompression chamber 14. As can be seen, first bale 37, and each bale thereafter remains in the decompression chamber 14 for two full cycles of recompression operation by recompression apparatus 10. The result is that each recompressed bale is held long enough for trapped air to escape and for the fibrous material to loose some of its resiliency prior to the time the bale twine 32 is subjected to the full recoil, expansion stress of a recompressed bale.

While there is shown and described the present preferred embodiment of the invention, it is to be distinctly understood that the invention is not limited thereto but may be variously embodied to practice within the scope of the following claims.

Accordingly, what I claim is:

1. A method for recompressing bales of fibrous material which comprises:
    introducing a field bale of fibrous material into a recompression chamber;
    recompressing said bale to a predetermined size;
    retieing the recompressed bale;
    transferring said recompressed bale, under compression, to a decompression chamber;
    holding said recompressed bale in the decompression chamber for a sufficient period of time for trapped air to escape from the recompressed bale and for the fibrous material of the recompressed bale to loose resiliency; and
    ejecting the recompressed bale from the decompression chamber.

2. The method of claim 1 wherein the recompressed bale is tied with bailing twine.

* * * * *